(12) United States Patent
Merrill

(10) Patent No.: X8825
(45) Date of Patent: May 16, 1835

(54) WATER WHEEL

(76) Inventor: William Merrill

William Merrell
Letters Patent

The Schedule referred to in these Letters Patent and making part of the same containing a description in the words of the said William Morrell himself of his improvement in the construction of a water wheel.

To all to whom these presents shall come
Be it known that I William Merrell of Randolph in the County of Potage and State of Ohio have invented a new and useful improvement in constructing and making and using a water wheel and that the following is a full and exact description of the construction and operation of the said water wheel as invented or improved by me. The wheel is formed by shaft and buckets, The shaft is made of a tree large enough to compose a hub or hubs two feet in diameter, to which the buckets are attached, the remainder of the shaft turned down to ten inches diameter. Five buckets (or more) form the wheel (or circle) the buckets may be made of wood or metal in a circular form with a square shoulder in the inside near the centre (parallel with shafts) also a small notch in the outside to serve as a lock as far as which the ajoining bucket laps on. The buckets three and half inches thick & eleven inches long, four inches of which is attached to the hub leaving six inches for issue and one inch at the end opposite the hub of the wheel to support to the ajoining bucket. Issues to be cut in each bucket six inches in length parallel with the shaft and two and half inches wide at the inside and two inches wide at the outside and cut in a circular form so as to give the water an easy passage. The buckets are to be pinned to the hub and a band around each end of the buckets (3/4 inch wide at the end the water enters) The wheel may be made with one or more sets of buckets or wheels on a shaft. It operates on the reaction principle and may be used on a perpendicular or horizontal shaft or a shaft sloping to any degree that may be necessary to accommodate the machine which which its to propel. The water enters the eux of the wheel (all round
the shaft) and discharges at the sides. The floom or Penstock must
be made suitable for the number of wheels (or sets of buckets) used on a
shaft. And a wheel may be placed within the floom or penstock
the gate hoisting below (give full draft of water into the wheel) this
the wheel will be surrounded with water which will prevent
freezing in winter or drying in summer. there must be a tun-
nel made of thick plank and placed at the end of each wheel
or set of buckets to convey the water into them. The proportion of wa-
ter into the wheel to that out at the issues must be six to one. This
wheel will run under the surface of water with equal rapidity
as if above water surface. It may also be placed under the end of
the floom or at the side the accompanying drafts fully show Witnesses Isaac Merriman
Asa W Rawson William Merrell Ex. [illegible]

[illegible]